Dec. 3, 1963    D. J. DONALDSON    3,112,994
METHOD FOR CONTINUOUS DIGESTION OF ALUMINOUS ORE
Filed March 23, 1960
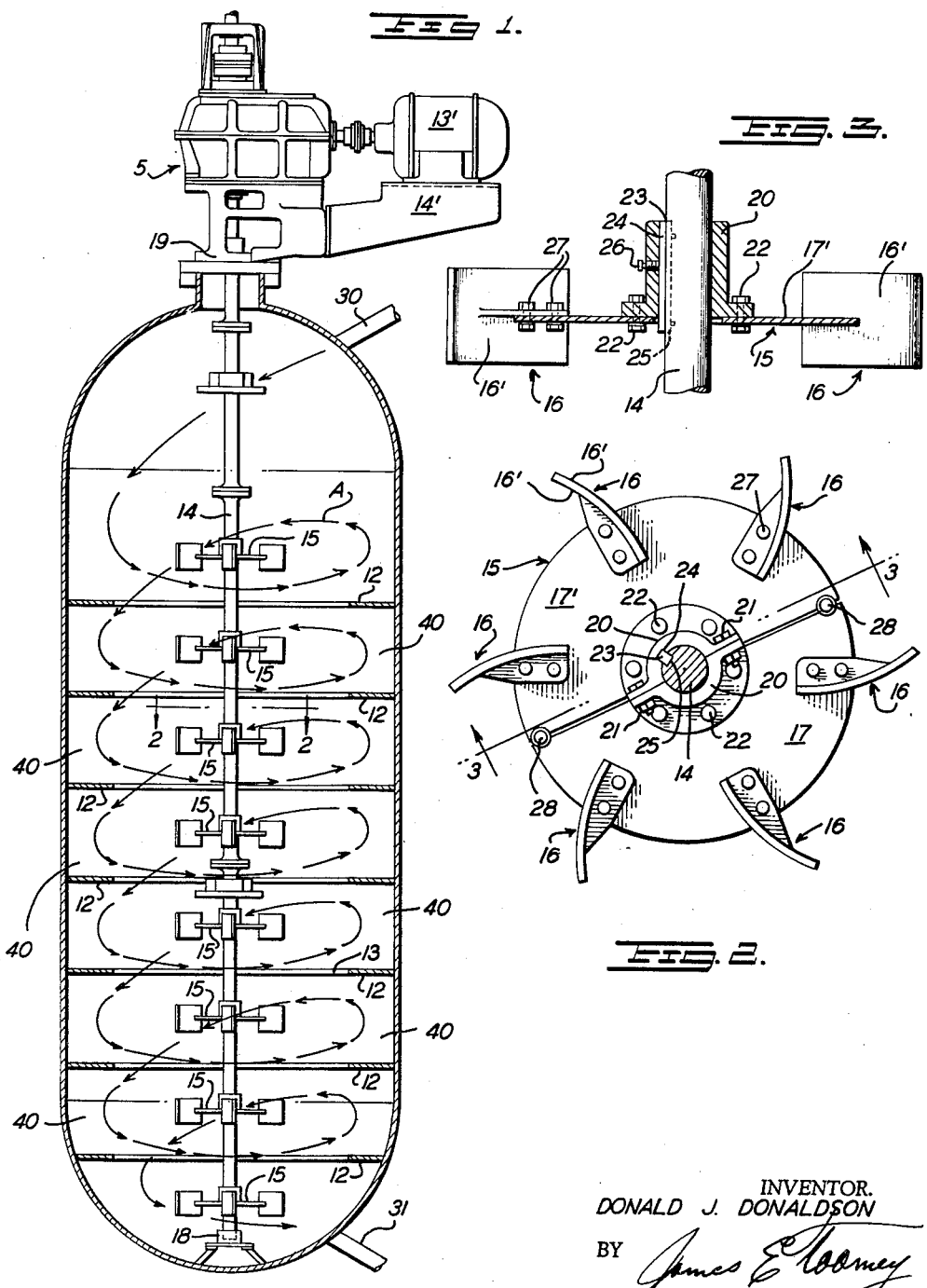
INVENTOR.
DONALD J. DONALDSON
BY James E. Looney
ATTORNEY United States Patent Office 3,112,994
Patented Dec. 3, 1963

3,112,994
METHOD FOR CONTINUOUS DIGESTION OF ALUMINOUS ORE
Donald J. Donaldson, Baton Rouge, La., assignor to Kaiser Aluminum & Chemical Corporation, Oakland, Calif., a corporation of Delaware
Filed Mar. 23, 1960, Ser. No. 17,177
5 Claims. (Cl. 23—143)

This invention relates to digesting methods and apparatus and more particularly to a novel method and apparatus for digesting aluminous ores in caustic aluminate liquors.

In the classic Bayer process for producing alumina from aluminous ores, a digestion step is performed to extract and solubilize the alumina from the raw aluminous ores in caustic aqueous aluminate liquor. This is generally accomplished at elevated temperatures and pressures in pressure digesters. These digesters comprise large, cylindrical, horizontally disposed vessels into which a slurry of the aluminous ore and caustic aluminate liquor is pumped. Live steam at high pressures is usually introduced into the slurry and/or conventional indirect heat exchangers are used to heat the slurry or caustic aqueous aluminate liquor to the desired digestion temperature.

The slurry mixture is maintained within the digester for a predetermined period of time to permit extraction of the alumina and solubilization in the liquor, after which time the slurry mixture is flash cooled and pumped out and then treated according to the well-known subsequent steps of the Bayer process.

The above-described digester vessel produces some degree of extraction of the alumina. However, due to the design of the digester vessel and the manner in which it is used, short-circuiting of the slurry usually takes place through the vessel. This short-circuiting of the slurry through the vessel reduces the over-all efficiency of the extraction step.

It is a primary purpose of the instant invention to provide an improved method and apparatus for continuously digesting aluminous ores in caustic aluminate liquor whereby maximum efficiency in the process of extracting and solubilizing aluminous ores in caustic aluminate liquors is attained.

Other advantages and purposes of the instant invention will be observed by reference to the following detailed description when taken in conjunction with the appended drawings, which disclose a preferred form of apparatus for carrying out this invention, wherein FIG. 1 is a vertical cross-sectional view of one type of digester vessel that may be used in practicing the instant invention;

FIG. 2 is a sectional view taken along line 2—2 of FIG. 1; and

FIG. 3 is a sectional view with parts removed taken along line 3—3 of FIG. 2.

Referring now to the drawings, the digester of FIG. 1 generally comprises a vertical cylindrical shell or vessel 10 preferably made of a material resistant to the chemical action of reactive materials and strong enough to withstand high temperatures and pressures. Securely attached to the inner wall of vessel 10 in horizontally disposed and spaced relationship are a plurality of doughnut shaped baffle rings 12. Each baffle ring is of a suitable thickness and extends inwardly a short distance from the inner wall whereby a large aperture 13 is provided in each ring 12 through which extends a rotatable shaft 14. This shaft is rotated by any suitable means such as by motor 13' mounted on platform 14' through the medium of any conventional power transmitting means such as gears or the like as at 5. The shaft 14 is supported by sealed bearing members 18 and 19 so that high pressure operations may be conducted within the vessel. A plurality of circular baffle plates 15 are secured to shaft 14.

In an advantageous embodiment of the invention, a plurality of baffle plates 15 are positioned along the axial length of shaft 14 in spaced relationship to each other and each of these plates is provided with a series of vertically disposed stirring paddles 16. Although these paddles are shown as being curved, they may also be flat or straight in vertical cross section and, in any event, their major surface areas 16' are disposed in vertical planes so that they cannot violently agitate the contents of the vessel. Plates 15 can be advantageously split into two segments 17 and 17'. These segments are secured to each other by means of conventional split collars 20 and bolts 21. Each split collar 20 is secured to its respective plate segment 17 or 17' by bolts 22. Each complete plate 15 is keyed to the shaft 14 by means of the split collars 20 and the key 23. Key 23 is disposed in recess 24 in one of the split collars 20 and in cooperating recess 25 in the shaft 14.

Screws 26 are finally inserted in suitable openings in one of the split collars 20 and the shaft 14 and complete the anchoring of the plates 15 along with the blades or paddles 16 to the shaft. Paddles 16 are secured to the plate segments 17 or 17' by bolts 27. Additional bolts 28 can be used to secure the segments 17 and 17' to each other. Each plate 15 is advantageously disposed substantially midway between a pair of baffle rings 12. The vessel 10 is provided at the top portion thereof with inlet means such as line 30 and at the bottom thereof with outlet means such as line 31.

During an operating cycle, a slurry of aluminous ore in caustic aluminate liquor is pumped into the vessel 10 through line 30. The liquor has been heated to very high temperatures by live steam injection and a series of heat exchangers. The liquor flows slowly through the vessel and a predetermined nominal or average holding time or residence time is maintained by regulating the flow rates. As the liquor flows through the vessel, the motor 13' slowly rotates the shaft 14 thereby causing the paddles 16 to merely gently stir the liquor without producing any violent agitation of the same. The arrangement of baffle rings 12 and rotating plates 15 and paddles 16 with respect to each other is such that short-circuiting and back-mixing of the contents of the vessel are minimized and the flow characteristics of the contents of the vessel approximate a plug-type flow. In other words, as the vessel is continuously filled with a slurry of aluminous ore in caustic aluminate liquor, the slurry can be considered as being comprised of individual successive slurry layers stacked one on top of each other. The addition of a new layer at the top of the vessel produces a corresponding displacement of each succeeding lower layer formed between adjacent baffle rings 12. Because of the disposition of baffle plates 15 and plates 16 between baffle rings 12, their particular configuration and slow speed of travel, no violent agitation of the slurry occurs in the layers or compartments formed between baffle rings 12. Instead, the disposition and structure of baffle rings 12, baffle plates 15 and paddles 16 are such that they merely direct the flow of liquor and aluminous ores through the vessel while at the same time minimizing short-circuiting and vertical mixing within the vessel. These elements also cooperate with one another in such a fashion that a circular motion with a minimum amount of vertical flow is imparted to the contents of the vessel as they pass through the vessel. Accordingly, although the various aluminous ore particles in the slurry follow a roughly helical path of travel through the vessel, this helical path of travel A consists of relatively wide, individual turns or windings spaced a short distance apart with the diameter of the windings being substantially greater than the pitch of the windings. The baffle rings 12 also minimize back-mixing of the slurry. Thus, the vessel actually comprises a series of separate compartments or zones in which the flow of the slurry is directed or controlled to minimize vertical flow and short-circuiting. Each compartment thus approximates an individual plug-type flow reactor zone.

In one specific example of apparatus and method which has been used to date to extract alumina from primarily monohydrate-type ores, three identical vertically arranged vessels disposed and operating in series were used. Each vessel had a length of 89'4 9/16" and an internal diameter of 11'6". Each vessel was divided into eight compartments separated by doughnut shaped baffle rings 12 spaced 9' apart. Each of these rings had an internal diameter of 9'6" whereby an orifice of 9'6" existed between each of the compartments 40 formed by rings 12. A flat baffle plate 15 28¼" in diameter was mounted on shaft 14 and centrally disposed in each compartment. Each plate 15 was located substantially midway between and in staggered relationship to a pair of rings 12 and the various adjacent plates 15 were spaced 9' apart. Shaft 14 was rotated at approximately 40 r.p.m. There was continuously introduced into the first vessel 10 through line 30 an aqueous stream comprised of a Bauxite slurry made up of 50% solids with spent caustic liquor and containing primarily monohydrate-type aluminous ores. This stream had been previously blended with an excess amount of spent liquor containing 210 g./l. caustic in accordance with the usual good practice in this art. This latter liquor was previously heated to 415–430° F. in a series of heat exchangers. Live steam at 650 p.s.i.g. was injected into the above stream which flowed in at a rate of 6,072 gallons per minute to maintain a temperature of about 473° F. and a pressure of 540 p.s.i.g. in the digester. The stream was withdrawn from the first vessel at a rate of 6,200 gallons per minute and then fed to the next succeeding vessel in the series where the stream was again treated as described above. Thereafter, the treated stream was removed from the second vessel or digester and fed to the third and final vessel or digester where the stream was again treated in the same fashion as in the two preceding vessels. The mean residence time for any given solids particle in each vessel was approximately ten minutes or approximately thirty minutes total mean or average residence time in the series of vessels. It is to be understood, of course, that depending on the type of ores being treated and the specific results desired the aforesaid residence times can be changed as required.

Based on this total residence time, it was found that approximately 99% of the total available alumina in the ore was extracted. This residence time was obtained during passage of the liquor and ore through the successive separate reactor zones or compartments 40 in each vessel by retarding the flow of liquor and ore through the zones. This retarding was effected by gently and intermittently converting the normal laminar flow of liquor and ore to a slow circulatory flow and without producing any violent stirring and agitation of the liquor and ore.

The use of baffle rings 12 together with baffle plates 15 contributed materially in maintaining the desirable total residence time of approximately thirty minutes by controlling and producing a plug-type flow of the stream comprised of liquor and aluminous ores through the vessel and in minimizing short-circuiting. It will be understood that the above specific description of operating conditions sets forth one example of the mode of carrying out the invention. Where "caustic" is referred to in this specification and claims, it is intended to mean NaOH or caustic soda calculated as $Na_2CO_3$.

An advantageous embodiment of the invention has been disclosed and described. It is obvious that various changes and modifications may be made therein without departing from the spirit and scope thereof as defined by the appended claims wherein what is claimed is:

1. A method for continuously digesting an aluminous ore in a caustic aluminate liquor within an enclosed vessel and at elevated temperatures and pressures comprising the steps of continuously introducing a caustic aluminate liquor containing an aluminous ore in suspension into the said vessel, incrementally passing said liquor and ore through successive separate reactor zones and, while incrementally passing said liquor and ore through said zones, retarding the flow of said liquor and ore through said zones by intermittently converting the normal laminar flow of liquor and ore to a slow circulatory flow.

2. A method as set forth in claim 1 wherein the residence time of a particle of ore in said vessel is maintained at approximately ten minutes.

3. A method as set forth in claim 1 wherein the normal over-all path of travel of the ore and liquor in said vessel is in a downward direction.

4. A method for continuously digesting an aluminous ore in a caustic aluminate liquor at elevated temperatures and pressures within an enclosed vessel comprising the steps of continuously introducing a caustic aluminate liquor containing an aluminous ore in suspension into the said vessel, incrementally passing said liquor and ore through successive separate reactor zones and, while passing said liquor and ore through said zones, retarding the flow of said liquor and ore by gently and intermittently converting the normal laminar flow of liquor and ore to a slow circulatory flow and without producing any violent agitation and stirring of the liquor and ore.

5. A method as set forth in claim 4 wherein the residence time of a particle of ore in said vessel is maintained at approximately ten minutes.

References Cited in the file of this patent
UNITED STATES PATENTS

| | | |
|---|---|---|
| 1,138,201 | Ellis | May 4, 1915 |
| 1,208,534 | Foret | Dec. 12, 1916 |
| 2,107,919 | Turner | Feb. 8, 1938 |
| 2,143,310 | Fulda et al. | Jan. 10, 1939 |
| 2,244,194 | Haglund | June 3, 1941 |
| 2,582,899 | Barneby et al. | Jan. 15, 1952 |
| 2,592,112 | Bradshaw et al. | Apr. 8, 1952 |
| 2,926,182 | Sutton | Feb. 23, 1960 |